US009836458B1

(12) United States Patent
Jiang et al.

(10) Patent No.: US 9,836,458 B1
(45) Date of Patent: Dec. 5, 2017

(54) WEB CONFERENCE SYSTEM PROVIDING MULTI-LANGUAGE SUPPORT

(71) Applicant: International Business Machines Corporation, Armonk, NY (US)

(72) Inventors: Qi En Jiang, Beijing (CN); Joey H. Y. Tseng, Taipei (TW); Di Wu, Beijing (CN); Xi Bo Zhu, Beijing (CN); Dong Jun Zong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/273,965

(22) Filed: Sep. 23, 2016

(51) Int. Cl.
| | | |
|---|---|---|
| *G06F 17/28* | (2006.01) | |
| *H04L 29/06* | (2006.01) | |
| *G06F 17/27* | (2006.01) | |
| *G06F 17/20* | (2006.01) | |
| *H04L 12/58* | (2006.01) | |
| *H04L 29/08* | (2006.01) | |

(52) U.S. Cl.
CPC .......... *G06F 17/289* (2013.01); *G06F 17/275* (2013.01); *H04L 65/403* (2013.01); *H04L 51/04* (2013.01); *H04L 51/10* (2013.01); *H04L 67/10* (2013.01); *H04L 67/18* (2013.01)

(58) Field of Classification Search
CPC ... G06F 17/289; G06F 17/275; H04L 65/403; H04L 67/10; H04L 67/18; H04L 51/04; H04L 51/10
USPC ........................................ 704/2, 3, 5, 8, 277
See application file for complete search history.

(56) References Cited

U.S. PATENT DOCUMENTS

| | | | |
|---|---|---|---|
| 8,885,013 | B2 | 11/2014 | Periyannan et al. |
| 9,160,967 | B2 | 10/2015 | Wang et al. |
| 2002/0169592 | A1 | 11/2002 | Aityan |
| 2008/0065446 | A1 | 3/2008 | Haveliwala et al. |

(Continued)

FOREIGN PATENT DOCUMENTS

| | | |
|---|---|---|
| CN | 102209227 A | 10/2011 |
| CN | 102521221 A | 6/2012 |

OTHER PUBLICATIONS

Maaike Villavicencio Fernandez, "Virtual Meetings: The Language Issue," http://www.presencegroup.eu/translations/2015/09/29/virtual-meetings-the-language-issue, Sep. 29, 2015, pp. 1-9.

(Continued)

*Primary Examiner* — Thierry L Pham
(74) *Attorney, Agent, or Firm* — Robert A. Voight, Jr.; Winstead, P.C.

(57) ABSTRACT

A method, system and computer program product for enabling attendees of a web conference to view materials of the web conference in their native language. When the conference server determines that the preferred native language of the attendee differs from the preferred native language of the presenter of the web conference, the conference server creates a virtual environment that is a clone of a host environment of the presenter that runs a native language pack of the preferred native language of the attendee. Upon the presenter starting the web conference, the screen shot shared by the presenter to the attendees is captured from the host environment of the presenter and then translated into the preferred native language of the attendee using the native language pack of the attendee's virtual environment. The translated screen shot is then sent to the attendee in the attendee's preferred native language from the virtual environment.

20 Claims, 6 Drawing Sheets

(56) References Cited

U.S. PATENT DOCUMENTS

2010/0283829 A1   11/2010  De Beer et al.
2011/0246172 A1   10/2011  Liberman et al.

OTHER PUBLICATIONS

OmNovia, "omNovia Introduces Multilingual Web Conferencing Platform," https://www.omnovia.com/omnovia-introduces-multi-lingual-web-conferencing-platform, 2016, pp. 1-5.

WEB CONFERENCE SYSTEM PROVIDING MULTI-LANGUAGE SUPPORT

TECHNICAL FIELD

The present invention relates generally to web conferences, and more particularly to a web conference system that provides multi-language support so that attendees can view the host materials in their native language.

BACKGROUND

Web conferences are an online collaborative service, including web seminars, webcasts and peer-level meetings. Typically, at these web conferences, the presenter or host shares his screen ("screen sharing") with the other attendees of the web conference. That is, the attendees will receive a screen shot of what is shown in the presenter's screen (e.g., slide of a presentation).

In some web conferences, the attendees may reside in other countries (e.g., China) than the presenter (e.g., Canada). Hence, the attendees' native language (e.g., Chinese) may be different than the host's native language (e.g., English). As a result, the attendees may have a difficult time in understanding the presentation if the host presents materials in a different language than the native language of the attendees.

As a result, the presenter may attempt to translate the materials to be shared to the other attendees ahead of time in their native language in order for the attendees to follow the presenter's presentation. However, the presenter may not be proficient in translating the materials to other languages, including the languages of the attendees. Furthermore, such a process is very time consuming.

Unfortunately, there is not currently a means for enabling attendees with a different native language than the host to easily follow and understand the host's presentation in the web conference.

SUMMARY

In one embodiment of the present invention, a method for enabling attendees of a web conference to view materials of the web conference in their native language comprises receiving a request from an attendee to join the web conference. The method further comprises detecting a native language type of the attendee. The method additionally comprises creating, by a processor, a virtual environment that is a clone of a host environment of a presenter of the web conference that runs a native language pack of a preferred native language of the attendee based on the detected native language type of the attendee or a language preference indicated by the attendee in response to the preferred native language of the attendee being different from a preferred native language of the presenter, where the native language pack of the preferred native language of the attendee translates an operating system and an application user interface of the host environment into the preferred native language of the attendee. Furthermore, the method comprises capturing a shared screen shot of a screen from the host environment of the presenter of the web conference. Additionally, the method comprises translating the captured shared screen shot into the preferred native language of the attendee using the native language pack of the preferred native language of the attendee. In addition, the method comprises sending the translated captured shared sheen shot in the preferred native language of the attendee to the attendee from the virtual environment.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for enabling attendees of a web conference to view materials of the web conference in their native language. In one embodiment of the present invention, a conference server receives a request from an attendee to join a web conference (e.g., web seminar, webcast, peer-level meeting). The conference server detects the native language type of the attendee requesting to join the web conference. The detected native language type of the attendee is identified as being the preferred native language of the attendee unless the attendee indicates a different language preference. When the conference server determines that the preferred native language of the attendee differs from the preferred native language of the presenter of the web conference, the conference server creates a virtual environment that is a clone of a host environment of the presenter that runs a native language pack of the preferred native language of the attendee. The native language pack of the preferred native language of the attendee translates an operating system and application user interface of the host environment into the preferred native language of the attendee. Upon the presenter starting the web conference, the screen shot shared by the presenter to the attendees is captured from the host environment of the presenter of the web conference. The captured shared screen shot is translated into the preferred native language of the attendee using the native language pack of the preferred native language of the attendee and then sent to the attendee in the preferred native language of the attendee from the virtual environment. In this manner, attendees with a different native language than the host can easily follow and understand the host's presentation in the web conference by having the conference server provide multi-language support.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
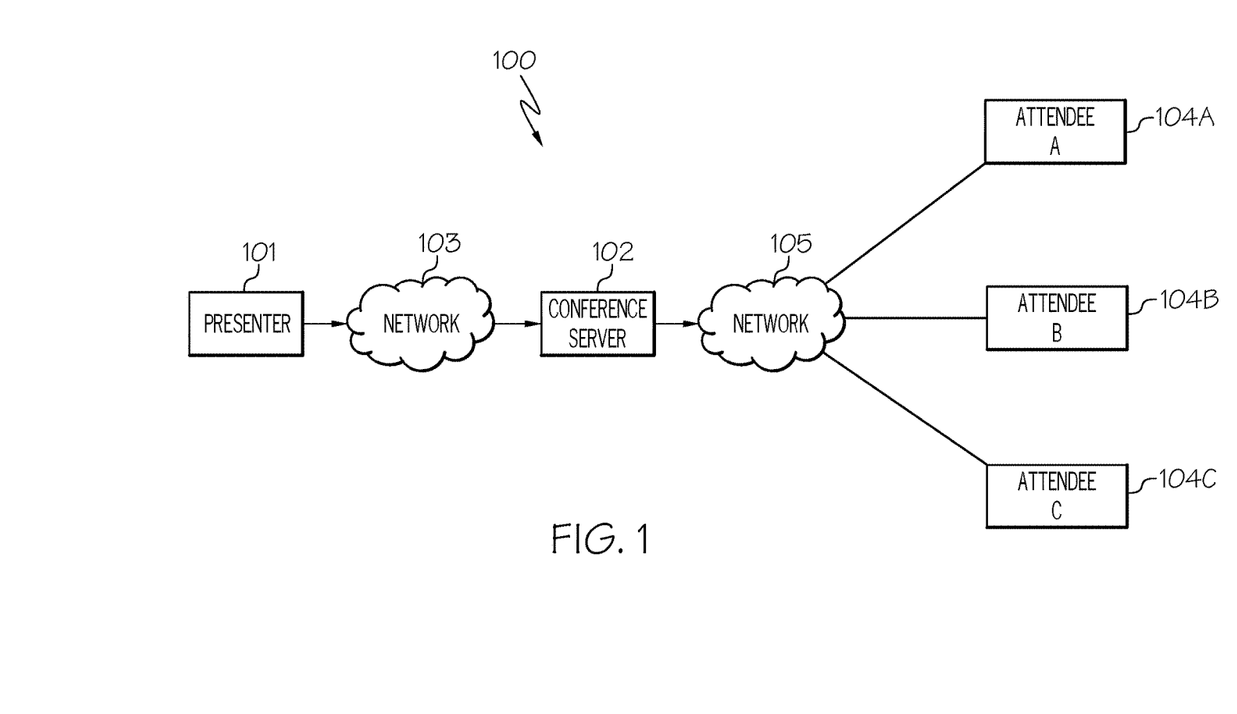
FIG. 1 illustrates a web conferencing system configured in accordance with an embodiment of the present invention.

Referring now to the Figures in detail, FIG. 1 illustrates a web conferencing system 100 configured in accordance with an embodiment of the present invention. Referring to FIG. 1, web conferencing system 100 includes a presenter's or host's client device 101 (identified as "Presenter" in FIG. 1) (both the presenter and the presenter's client device are identified with element 101) connected to a conference sever 102 via a network 103. Presenter 101 (also referred to as the "host"), as used herein, refers to the user who conducts the web conference (seminar, webcast, and peer-level web meeting), such as delivering a presentation or demonstration over the web to a group of geographically dispersed participants or attendees.

Web conferencing system 100 further includes attendees' client devices 104A-104C (identified as "Attendee A," "Attendee B," and "Attendee C," respectively) (both attendees and the attendees' client devices are identified with element 104) connected to conference server 102 via a network 105. In this manner, presenter 101 can be in communication with attendees 104 via conference server 102. Attendees' client devices 104A-104C may collectively or individually be referred to as attendees' client devices 104 or attendee client device 104, respectively. Attendees 104, as used herein, refer to the user who is participating in a web conference with the host or presenter 101.

While FIG. 1 illustrates separate networks 103, 105 to allow presenter 101 to be in communication with attendees 104 via conference server 102, the principles of the present invention are not to be limited in such a manner. Presenter 101 and attendees 104 and conference server 102 may all be interconnected via one or more networks.

Presenter's and attendees' client devices 101, 104 may be a portable computing unit, a Personal Digital Assistant (PDA), a smartphone, a laptop computer, a mobile phone, a navigation device, a game console, a desktop computer system, a workstation, an Internet appliance and the like. A description of the hardware configuration of presenter's and attendees' client devices 101, 104 is provided below in connection with FIG. 2.

Networks 103, 105 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Conference server 102 is configured to facilitate online collaborative services, including, but not limited to, web seminars, webcasts, and peer-level web meetings. In particular, conference server 102 of the present invention is configured to provide multi-language support so that attendees 104 can view the host materials in their native language. A description of the hardware configuration of conference server 102 is provided below in connection with FIG. 3.

System 100 is not to be limited in scope to any one particular network architecture. System 100 may include any number of presenters 101, conference servers 102, attendees 104 and networks 103, 105.

Figure 2:
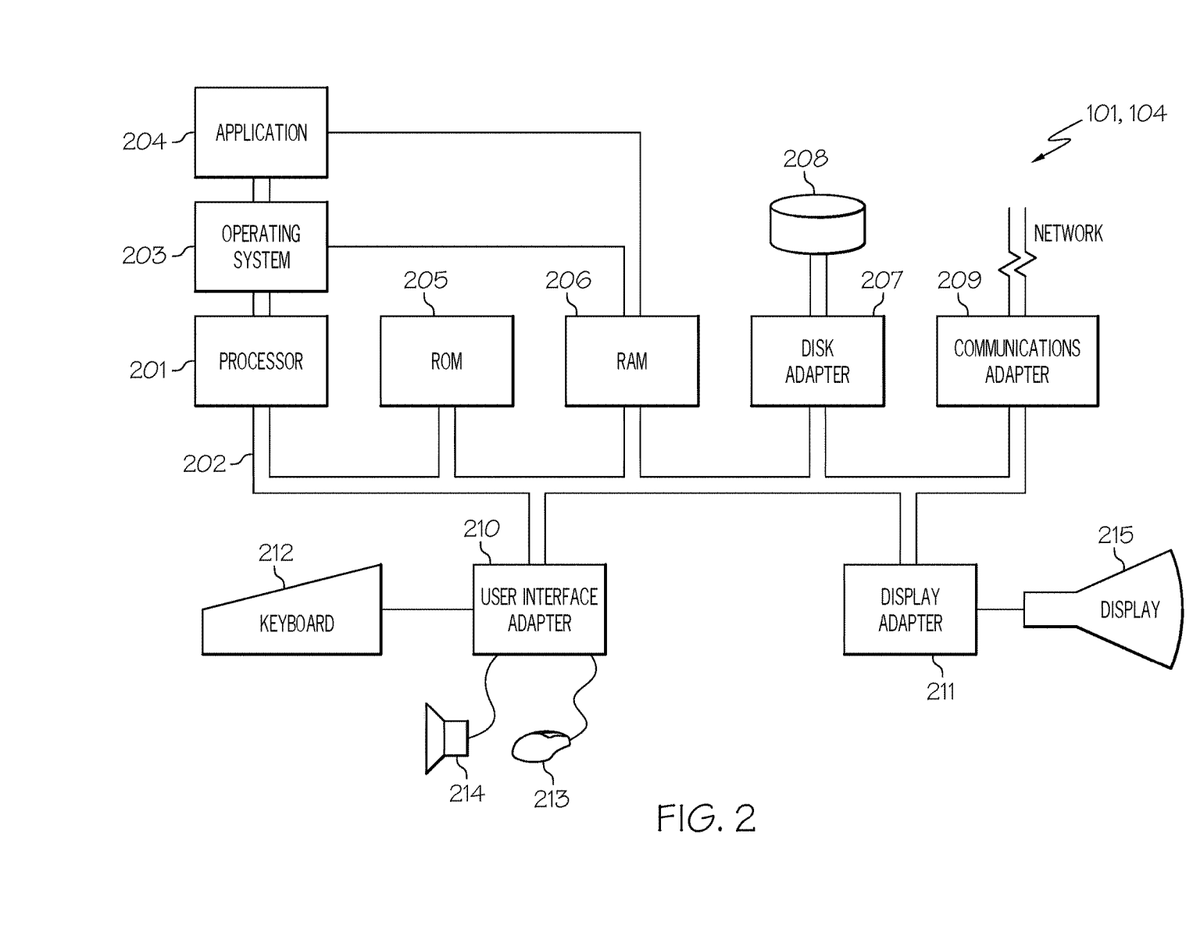
FIG. 2 illustrates a hardware configuration of the presenter's and attendees' client devices configured in accordance with an embodiment of the present invention.

Referring now to FIG. 2, FIG. 2 illustrates a hardware configuration of presenter's and attendees' client devices 101, 104 (FIG. 1) which is representative of a hardware environment for practicing the present invention. Referring to FIG. 2, client device 101, 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser that allows a user to request to conference server 102 to join a web conference, to terminate a web conference as well as to change the preferred native language stored by conference server 102 as discussed further below in connection with FIGS. 4 and 5A-5B.

Referring again to FIG. 2, read-only memory ("ROM") 205 is coupled to system bus 202 and includes a basic input/output system ("BIOS") that controls certain basic functions of client device 101, 104. Random access memory ("RAM") 206 and disk adapter 207 are also coupled to system bus 202. It should be noted that software components including operating system 203 and application 204 may be loaded into RAM 206, which may be client device's 101, 104 main memory for execution. Disk adapter 207 may be an integrated drive electronics ("IDE") adapter that communicates with a disk unit 208, e.g., disk drive.

Client device 101, 104 may further include a communications adapter 209 coupled to bus 202. Communications adapter 209 interconnects bus 202 with an outside network (e.g., network 103, 105 of FIG. 1) thereby enabling client device 101, 104 to communicate with other devices (e.g., conference server 102 of FIG. 1).

I/O devices may also be connected to client device 101, 104 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101, 104 through keyboard 212 or mouse 213 and receiving output from client device 101, 104 via display 215 or speaker 214. Other input mechanisms may be used to input data to client device 101, 104 that are not shown in FIG. 2, such as display 215 having touch-screen capability and keyboard 212 being a virtual keyboard. Client device 101, 104 of FIG. 2 is not to be limited in scope to the elements depicted in FIG. 2 and may include fewer or additional elements than depicted in FIG. 2.

Figure 3:
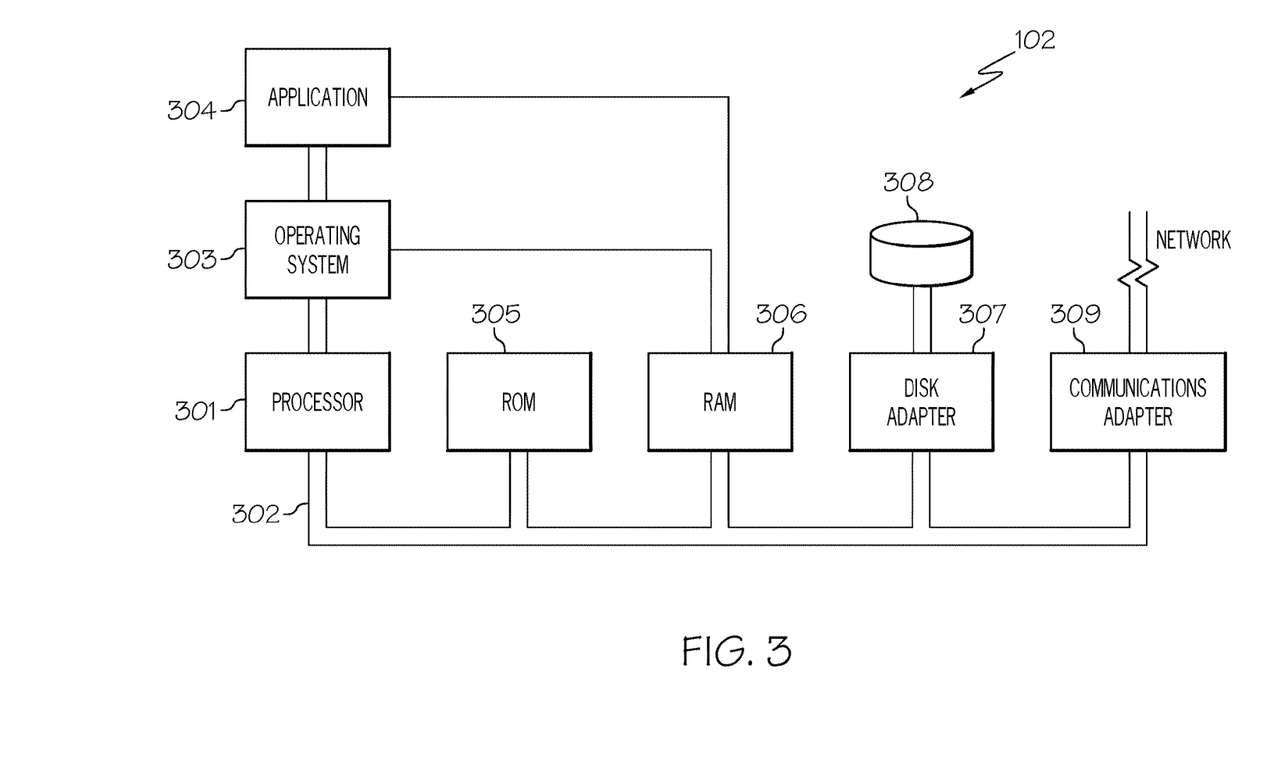
FIG. 3 illustrates a hardware configuration of a conference server configured in accordance with an embodiment of the present invention.

Referring now to FIG. 3, FIG. 3 illustrates a hardware configuration of conference server 102 (FIG. 1), which is representative of a hardware environment for practicing the present invention. Referring to FIG. 3, conference server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for enabling attendees 104 of a web conference to view materials of the web conference in their preferred native language as discussed further below in association with FIGS. 4 and 5A-5B.

Referring again to FIG. 3, read-only memory ("ROM") 305 is coupled to system bus 302 and includes a basic input/output system ("BIOS") that controls certain basic functions of conference server 102. Random access memory ("RAM") 306 and disk adapter 307 are also coupled to system bus 302. It should be noted that software components including operating system 303 and application 304 may be loaded into RAM 306, which may be conference server's 102 main memory for execution. Disk adapter 307 may be an integrated drive electronics ("IDE") adapter that communicates with a disk unit 308, e.g., disk drive. It is noted that the program for enabling attendees 104 of a web conference to view materials of the web conference in their preferred native language, as discussed further below in association with FIGS. 4 and 5A-5B, may reside in disk unit 308 or in application 304.

Conference server 102 may further include a communications adapter 309 coupled to bus 302. Communications adapter 309 interconnects bus 302 with an outside network (e.g., network 103, 105 of FIG. 1) thereby allowing conference server 102 to communicate with presenter 101 and attendees 104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in some web conferences, the attendees may reside in other countries (e.g., China) than the presenter (e.g., Canada). Hence, the attendees' native language (e.g., Chinese) may be different than the host's native language (e.g., English). As a result, the attendees may have a difficult time in understanding the presentation if the host presents materials in a different language than the native language of the attendees. As a result, the presenter may attempt to translate the materials to be shared to the other attendees ahead of time in their native language in order for the attendees to follow the presenter's presentation. However, the presenter may not be proficient in translating the materials to other languages, including the languages of the attendees. Furthermore, such a process is very time consuming. Unfortunately, there is not currently a means for enabling attendees with a different native language than the host to easily follow and understand the host's presentation in the web conference.

Figure 4:
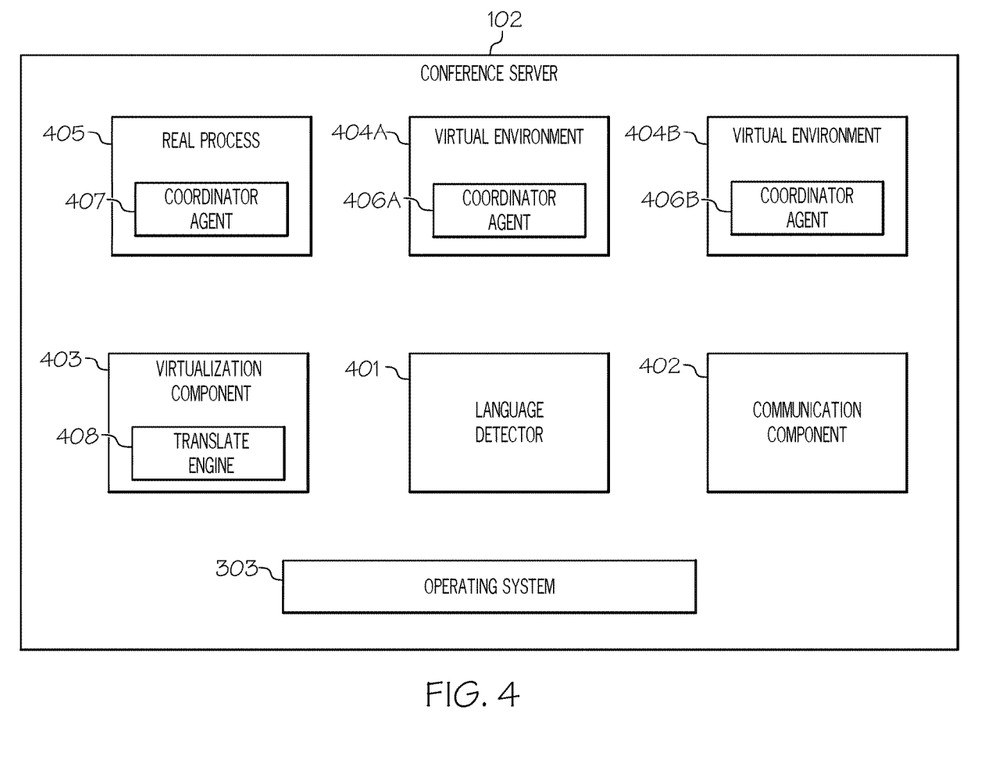
FIG. 4 is a diagram of the software components of the conference server used in connection with enabling the attendees with a different preferred native language than the host to easily follow and understand the host's presentation in the web conference in accordance with an embodiment of the present invention.
Figure 5A:
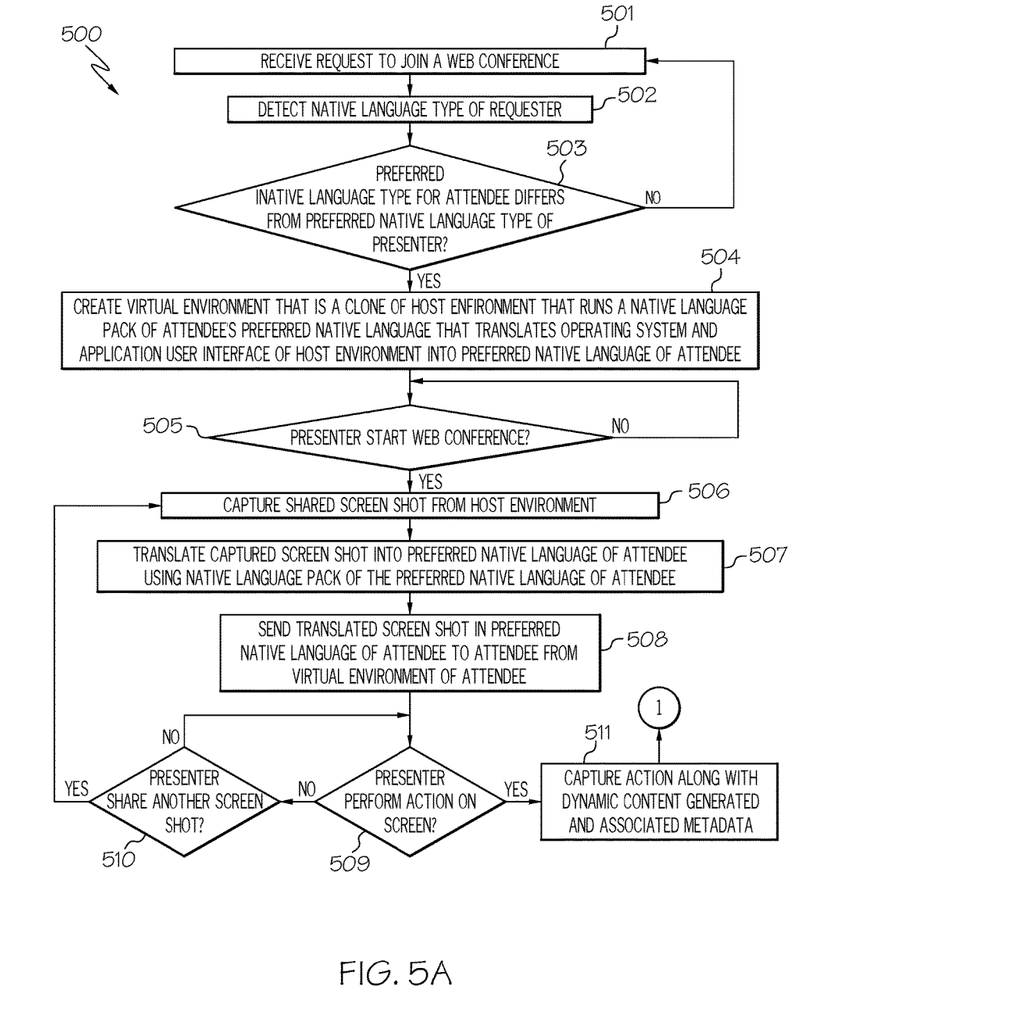
FIGS. 5A-5B are a flowchart of a method for enabling the attendees with a different preferred native language than the host to easily follow and understand the host's presentation in the web conference in accordance with an embodiment of the present invention.
Figure 5B:
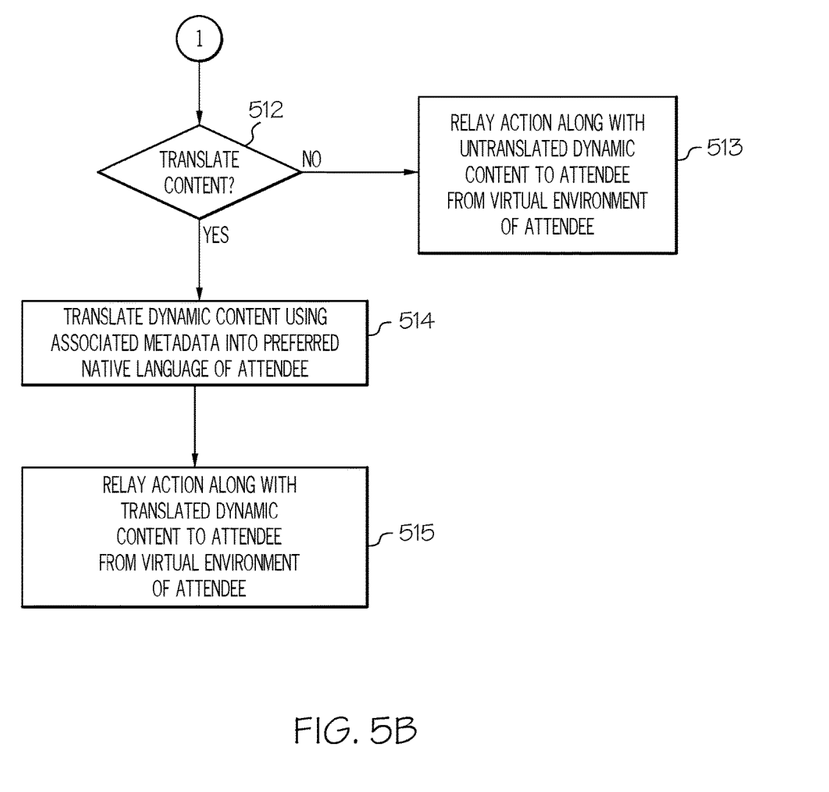

The principles of the present invention provide a means for enabling attendees with a different native language than the host to easily follow and understand the host's presentation in the web conference by having conference server 102 provide multi-language support as discussed below in connection with FIGS. 4 and 5A-5B. FIG. 4 is a diagram of the software components of conference server 102 used in connection with enabling attendees 104 with a different preferred native language than host 101 to easily follow and understand the host's presentation in the web conference. FIGS. 5A-5B are a flowchart of a method for enabling attendees 104 with a different preferred native language than host 101 to easily follow and understand the host's presentation in the web conference.

As stated above, FIG. 4 is a diagram of the software components of conference server 102 (FIGS. 1 and 3) used in connection with enabling attendees 104 with a different preferred native language than host 101 to easily follow and understand the host's presentation in the web conference in accordance with an embodiment of the present invention. In one embodiment, these software components may reside in application 304 (FIG. 3) of conference server 102.

The following provides a brief description of these software components. A more detailed description of these software components (including their functionalities) is provided below in conjunction with FIGS. 5A-5B.

Referring to FIG. 4, in conjunction with FIGS. 1-3, conference server 102 utilizes a language detector 401 that detects and saves the preferred language type for presenter 101 and attendee 104. For example, language detector 401 may detect the native language type of presenter 101/attendee 104 based on information exchanged between conference server 102 and presenter 101/attendee 104, respectively (e.g., information indicates a native language pack being utilized by an operating system of client device 101, 104).

Furthermore, conference server 102 includes a communication component 402 configured to communicate with presenter 101 and attendees 104, including receiving requests from presenter 101, attendee 104 to join a web conference, to quite the web conference, change the native language preference established by language detector 401 at any time, etc. as well as send the live activities of presenter 101 to attendees 104.

Additionally, upon conference server 102 establishing that one or more attendees 104 have a preferred native language that differs from the preferred native language of presenter 101, virtualization component 403 of conference server 102 creates virtual environments 404A-404B that are clones of the host environment of presenter 101 that run a native language pack of the preferred native language of attendee 104. In one embodiment, the preferred native language of attendee 104 is based on the native language type detected by language detector 401, which may be changed by attendee 104 at any time. The native language pack is configured to translate the operating system and application user interface of the host environment into the preferred native language of attendee 104. By utilizing native language packs in these virtual environments 404A-404B to translate the operating system and application user interface of the host environment into the preferred native language of attendee 104, it greatly reduces the translation efforts in both before or during the web conference. As a result, only dynamic contents may need to be translated.

Virtual environments 404A-404B may collectively or individually be referred to as virtual environments 404 or virtual environment 404, respectively. While FIG. 4 illustrates the creation of two virtual environments 404, virtualization component 403 may create any number of virtual environments 404 based on the number of attendees 104 with a different preferred native language than host 101.

As discussed above, one of the features of virtualization component 403 is to create a virtual environment 404 for an attendee 104 with a different preferred native language than host 101. For example, if presenter 101 is located in the United States and if attendee 104A is located in China, then virtualization component 403 may create a virtual environment 404 that runs a native language pack of Chinese. In another example, if attendee 104B is located in Germany, then virtualization component 403 may create a virtual environment 404 that runs a native language pack of Germany since presenter 101 is located in the United States.

As illustrated in FIG. 4, each virtual environment 404A-403B includes a coordinator agent 406A-406B, respectively. Furthermore, as illustrated in FIG. 4, real process 405 includes a coordinator agent 407. Coordinator agents 406A-406B may collectively or individually be referred to as coordinator agents 406 or coordinator agent 406, respectively. In one embodiment, virtualization component 403 installs coordinator agents 406 and coordinator agent 407 in virtual environments 404 and real process 405, respectively. In one embodiment, coordinator agents 406, 407 are used to synchronize the actions performed and dynamic contents generated from real process 405 to virtual images stored in corresponding cloned virtual environments 404 that run in different language packs. Real process 405 corresponds to the images ("real images") of the screen shots shared by presenter 101 as well as actions performed and dynamic content generated by presenter 101 in real-time.

For the dynamic content generated by presenter 101, host coordinator agent 407 sends out metadata related to the generated content (including the generated dynamic content) to coordinator agents 406, based upon which, coordinator agents 406 determine whether the associated content should be translated or not. As a result, the metadata is used to increase the translation accuracy and efficiency.

For such dynamic content that needs to be translated, such content is sent to virtualization component 403 by coordinator agent 406 to be translated into the appropriate preferred native language of attendee 104 by translate engine 408. For example, if virtual environment 404A runs a native language pack of Chinese, then translate engine 408 translates the received content from coordinator agent 406A into Chinese which will be later sent to the appropriate attendee 104 (e.g., attendee 104 that resides in China) from virtual environment 404A.

Each of the software components discussed above are managed by operating system 303 of conference server 102.

A further discussion of the functionalities of these software components in connection with enabling attendees 104 of a web conference to view materials of the web conference in their native language is discussed below in connection with FIGS. 5A-5B.

FIGS. 5A-5B are a flowchart of a method 500 for enabling attendees 104 with a different preferred native language than host 101 to easily follow and understand the host's presentation in the web conference in accordance with an embodiment of the present invention.

Referring to FIG. 5A, in conjunction with FIGS. 1-4, in step 501, communication component 402 of conference server 102 receives a request to join a web conference (e.g., web seminar, webcast, peer-level meetings) from presenter 101 or attendee 104.

In step 502, language detector 401 of conference server 102 detects the native language type of the requester (i.e., presenter 101 or attendee 104) requesting to join the web conference. In one embodiment, information is exchanged between the requester (i.e., presenter 101 or attendee 104) and language detector 401, such as the native language pack being utilized by the operating system of presenter's client device 101 or attendee's client device 104. Upon detecting the native language type of presenter 101 or attendee 104, language detector 401 saves the native language type for presenter 101/attendee 104 as the presenter's 101 or attendee's 104 "preferred native language type." The "preferred native language type," as used herein, refers to the native language that is preferred to be used by presenter 101 or attendee 104. In one embodiment, presenter 101/attendee 401 may change the preferred native language stored by language detector 401.

In the case where an attendee 104 is the requester, in step 503, a determination is made by virtualization component 403 as to whether the preferred native language type for attendee 104 differs from the preferred native language type of presenter 101.

If the preferred native language for attendee 104 does not differ from the preferred native language of presenter 101, then conference server 102 waits to receive a subsequent request from presenter 101 or attendee 104 to join the web conference in step 501.

If, however, the preferred native language for attendee 104 differs from the preferred native language of presenter 101, then, in step 504, virtualization component 303 creates a virtual environment 404 that is a clone of the host environment of presenter 101 that runs a native language pack of attendee's preferred language that translates the operating system and application user interface of the host environment of presenter 101 into the preferred native language of attendee 104.

Upon creating a virtual environment 404 for an attendee 104 with a different preferred native language than presenter 101, virtualization component 403 of conference server 102 in step 505 determines whether presenter 101 has started the web conference.

If presenter 101 has not started the web conference, virtualization component 403 of conference server 102 continues to determine whether presenter 101 has started the web conference.

If, however, presenter 101 has started the web conference, then, in step 506, virtualization component 403 directs coordinator agent 407 of real process 405 to capture a screen shot of a screen (e.g., display 215) from the host environment of presenter 101 that was shared by presenter 101 to the other attendees of the web conference.

In step 507, coordinator agent 406 of conference server 102 translates the captured screen shot into the preferred native language of attendee 104 using the native language pack of the preferred native language of attendee 104. In one embodiment, host coordinator agent 407 sends the captured shared screen shot to coordinator agent 406 to be translated into the preferred native language of attendee 104.

In step 508, communication component 402 of conference server 102 sends the translated captured screen shot in the preferred native language of attendee 104 to attendee 104 from virtual environment 404 of attendee 104.

In step 509, a determination is made by coordinator agent 407 as to whether presenter 101 performed an action on the screen (e.g., display 215) of presenter's client device 101.

If presenter 101 did not perform any action on screen (e.g., display 215) of presenter's client device 101, then, in step 510, a determination is made by coordinator agent 407 as to whether it received a subsequent screen shot to be shared by presenter 101 to attendees 104 of the web conference.

If presenter 101 shared a subsequent screen shot to be shared to attendees 104 of the web conference, then coordinator agent 407 of real process 405 captures the shared screen shot of the screen (e.g., display 215) from the host environment of presenter 101 in step 506.

If, however, presenter 101 did not share a subsequent screen shot to attendees 104 of the web conference, then controller agent 407 determines whether presenter 101 performed an action on the screen (e.g., display 215) of presenter's client device 101 in step 509.

If presenter 101 performed an action on the screen of presenter's client device 101 (e.g., selecting a drop down menu that was shown on the presenter's screen 215 to illustrate selecting a particular option), then, in step 511, coordinator agent 407 captures the action (e.g., selecting drop drown menu) along with the generated dynamic content (e.g., showing options available after selecting drop down menu) and the associated metadata, where the associated metadata describes the contents and context of the dynamic content generated.

Referring now to FIG. 5B, in conjunction with FIGS. 1-4, in step 512, a determination is made by virtualization component 403 as to whether the dynamic content needs to be translated. In one embodiment, the associated metadata is used by virtualization component 403 to determine whether the content needs to be translated. For example, the metadata may indicate the type of input field of the content which may be used to determine whether the content needs to be translated in order for attendee 104 to understand the content. For instance, if the action performed by presenter 101 involved putting a score of a baseball game, then the score may be understood by attendee 104 without any translation being performed.

If the dynamic content does not need to be translated, then, in step 513, communication component 402 relays the action with the untranslated dynamic content to attendee 104 from virtual environment 404 of attendee 104 so that attendee 104 will view the action in a native setting (e.g., if attendee 104 has a preferred native language of Chinese, then attendee 104 will view the action in a Chinese setting) that is more intuitive and easier to understand for attendee 104.

If, however, the dynamic content needs to be translated, then, in step 514, translate engine 408 receives the dynamic content along with its associated metadata from coordinator agent 407 to be translated into the preferred native language of attendee 104 using the metadata associated with the dynamic content to improve the translation efforts.

In step 515, communication component 402 relays the action with the translated dynamic content to attendee 104 from virtual environment 404 of attendee 104 so that attendee 104 will not only view the action in a native setting (e.g., if attendee 104 has a preferred native language of Chinese, then attendee 104 will view the action in a Chinese setting) that is more intuitive and easier to understand for attendee 104 but will also be better able to understand the content which was translated in attendee's preferred native language.

It is noted for clarity that steps 505-515 are directed to what transpires after creating virtual environment 404 of attendee 104; however, during those steps, conference server 102 may receive a request to join a web conference from another attendee in step 501 and method 500 may proceed to step 501 with respect to that requester.

In this manner, the present invention enables attendees with a different preferred native language than the host to easily follow and understand the host's presentation in the web conference by having conference server 102 provide multi-language support.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for enabling attendees of a web conference to view materials of the web conference in their native language, the method comprising:
   receiving a request from an attendee to join said web conference;
   detecting a native language type of said attendee;
   creating, by a processor, a virtual environment that is a clone of a host environment of a presenter of said web conference that runs a native language pack of a preferred native language of said attendee based on said detected native language type of said attendee or a language preference indicated by said attendee in response to said preferred native language of said attendee being different from a preferred native language of said presenter, wherein said native language pack of said preferred native language of said attendee translates an operating system and an application user interface of said host environment into said preferred native language of said attendee;
   capturing a shared screen shot of a screen from said host environment of said presenter of said web conference;
   translating said captured shared screen shot into said preferred native language of said attendee using said native language pack of said preferred native language of said attendee; and
   sending said translated captured shared sheen shot in said preferred native language of said attendee to said attendee from said virtual environment.

2. The method as recited in claim 1 further comprising:
   capturing said shared screen shot from said host environment of said presenter of said web conference in response to said presenter staring said web conference.

3. The method as recited in claim 1 further comprising:
   capturing an action along with generated dynamic content and associated metadata in response to said presenter performing said action on said screen of said host environment.

4. The method as recited in claim 3 further comprising:
   translating said dynamic content into said preferred native language of said attendee using said associated meta; and
   relaying said action along with said translated dynamic content to said attendee from said virtual environment.

5. The method as recited in claim 3 further comprising:
   relaying said action along with said dynamic content to said attendee from said virtual environment in response to determining to not translate said dynamic content into said preferred native language of said attendee based on said associated metadata.

6. The method as recited in claim 1 further comprising:
   receiving a request from said attendee to change said preferred native language associated with said virtual environment to a different native language.

7. The method as recited in claim 1, wherein said native language type of said attendee is detected via an exchange of information from said attendee, wherein said information indicates a native language pack being utilized by an operating system of a client device of said attendee.

8. A computer program product for enabling attendees of a web conference to view materials of the web conference in their native language, the computer program product comprising a computer readable storage medium having program code embodied therewith, the program code comprising the programming instructions for:

receiving a request from an attendee to join said web conference;

detecting a native language type of said attendee;

creating a virtual environment that is a clone of a host environment of a presenter of said web conference that runs a native language pack of a preferred native language of said attendee based on said detected native language type of said attendee or a language preference indicated by said attendee in response to said preferred native language of said attendee being different from a preferred native language of said presenter, wherein said native language pack of said preferred native language of said attendee translates an operating system and an application user interface of said host environment into said preferred native language of said attendee;

capturing a shared screen shot of a screen from said host environment of said presenter of said web conference;

translating said captured shared screen shot into said preferred native language of said attendee using said native language pack of said preferred native language of said attendee; and sending said translated captured shared sheen shot in said preferred native language of said attendee to said attendee from said virtual environment.

9. The computer program product as recited in claim 8, wherein the program code further comprises the programming instructions for:

capturing said shared screen shot from said host environment of said presenter of said web conference in response to said presenter staring said web conference.

10. The computer program product as recited in claim 8, wherein the program code further comprises the programming instructions for:

capturing an action along with generated dynamic content and associated metadata in response to said presenter performing said action on said screen of said host environment.

11. The computer program product as recited in claim 10, wherein the program code further comprises the programming instructions for:

translating said dynamic content into said preferred native language of said attendee using said associated meta; and relaying said action along with said translated dynamic content to said attendee from said virtual environment.

12. The computer program product as recited in claim 10, wherein the program code further comprises the programming instructions for:

relaying said action along with said dynamic content to said attendee from said virtual environment in response to determining to not translate said dynamic content into said preferred native language of said attendee based on said associated metadata.

13. The computer program product as recited in claim 8, wherein the program code further comprises the programming instructions for:

receiving a request from said attendee to change said preferred native language associated with said virtual environment to a different native language.

14. The computer program product as recited in claim 8, wherein said native language type of said attendee is detected via an exchange of information from said attendee, wherein said information indicates a native language pack being utilized by an operating system of a client device of said attendee.

15. A system, comprising:

a memory unit for storing a computer program for enabling attendees of a web conference to view materials of the web conference in their native language; and a processor coupled to the memory unit, wherein the processor is configured to execute the program instructions of the computer program comprising:

receiving a request from an attendee to join said web conference;

detecting a native language type of said attendee;

creating a virtual environment that is a clone of a host environment of a presenter of said web conference that runs a native language pack of a preferred native language of said attendee based on said detected native language type of said attendee or a language preference indicated by said attendee in response to said preferred native language of said attendee being different from a preferred native language of said presenter, wherein said native language pack of said preferred native language of said attendee translates an operating system and an application user interface of said host environment into said preferred native language of said attendee;

capturing a shared screen shot of a screen from said host environment of said presenter of said web conference;

translating said captured shared screen shot into said preferred native language of said attendee using said native language pack of said preferred native language of said attendee; and sending said translated captured shared sheen shot in said preferred native language of said attendee to said attendee from said virtual environment.

16. The system as recited in claim 15, wherein the program instructions of the computer program further comprise:

capturing said shared screen shot from said host environment of said presenter of said web conference in response to said presenter staring said web conference.

17. The system as recited in claim 15, wherein the program instructions of the computer program further comprise:

capturing an action along with generated dynamic content and associated metadata in response to said presenter performing said action on said screen of said host environment.

18. The system as recited in claim 17, wherein the program instructions of the computer program further comprise:

translating said dynamic content into said preferred native language of said attendee using said associated meta; and relaying said action along with said translated dynamic content to said attendee from said virtual environment.

19. The system as recited in claim 17, wherein the program instructions of the computer program further comprise:

relaying said action along with said dynamic content to said attendee from said virtual environment in response to determining to not translate said dynamic content into said preferred native language of said attendee based on said associated metadata.

20. The system as recited in claim 15, wherein the program instructions of the computer program further comprise:

receiving a request from said attendee to change said preferred native language associated with said virtual environment to a different native language.

\* \* \* \* \*